United States Patent [19]

Spinner et al.

[11] Patent Number: 4,810,832
[45] Date of Patent: Mar. 7, 1989

[54] SEALED CABLE CONNECTOR

[75] Inventors: Georg Spinner, Feldkirchen-Westerham; Werner Appel, Starnberg, both of Fed. Rep. of Germany

[73] Assignee: Spinner GmbH, Elektrotechnische Fabrik, Munich, Fed. Rep. of Germany

[21] Appl. No.: 101,725

[22] Filed: Sep. 28, 1987

[30] Foreign Application Priority Data

Sep. 30, 1986 [DE] Fed. Rep. of Germany ....... 3633208

[51] Int. Cl.$^4$ ............................................ H02G 15/013
[52] U.S. Cl. .................................. 174/65 SS; 174/78; 277/DIG. 10; 285/3
[58] Field of Search .............................. 174/65 SS, 78; 277/DIG. 10; 285/158, 161, 3, 4

[56] References Cited

U.S. PATENT DOCUMENTS 2,985,291  5/1961 Schoepe et al. ............... 285/161 X
3,110,756 11/1963 Genung et al. ................. 174/78 X
3,290,062 12/1966 Ziherl et al. ........................ 285/3

Primary Examiner—A. C. Prescott
Assistant Examiner—David A. Tone
Attorney, Agent, or Firm—Henry M. Feiereisen

[57] ABSTRACT

A sealed cable connector includes a plug or coupler with a sleeve extending over the cable end and surrounding a strain relief ring, contoured annular seal and a thrust collar. The seal includes an outer ring and an inner ring which are connected with each other by a radial bridge. During assembly, the thrust collar and the strain relief ring cooperate with each other in such a manner that upon axial displacement of the thrust collar toward the strain relief ring by means of a screw plug turned into the sleeve, the bridge becomes sheared off thereby compressing the inner and outer rings within the respective inner and outer spaces between the thrust collar and the strain relief ring while at the same time the thrust collar presses the outer cable conductor against a contacting face of the sleeve.

10 Claims, 1 Drawing Sheet

SEALED CABLE CONNECTOR

FIELD OF THE INVENTION

The present invention refers to a sealed cable connector e.g. for connecting coaxial cables.

BACKGROUND OF THE INVENTION

Known cable connectors include a plug or coupler which is provided with a sleeve extending over the cable end to be connected and surrounding a strain relief ring, a contoured annular seal and a thrust collar which axially compresses the seal upon insertion of a screw plug so that the seal radially bears inwardly against the cable insulation and radially bears outwardly against the inside of the sleeve.

For attaining a sealed or tight connection between the sleeve and the cable end or also for sealing a cable bushing, the so-called "packing box principle" is frequently applied in which a hollow screw turned into the sleeve axially compresses a rubber ring against a metallic collar or the like so as to be expanded radially inwardly and outwardly for providing the desired sealing action.

This principle may seem to be sound, however, it frequently happened that the radial pressure exerted on the cable or its outer insulation exceeded admissible limits thereby resulting in a constriction because of the cold flow of the outer and/or inner cable insulation. Thus, the strength and in particular the electric properties of the cable are impaired e.g. a local decrease of the wave impedance in coaxial cables.

It was thus proposed to modify the strain relief ring, which also provides the contacting of the outer conductor of the cable with the metallic sleeve, with a ring-shaped cutting edge directed toward a shim-type thrust collar while the contoured annular seal includes a V-shaped cross section open toward the cutting edge. Thus, the screw plug can be tightened only until the cutting edge bears against the thrust collar whereby the annular seal is severed.

Since the displacement and thus the compression of the seal is at most equal to its width in axial direction as measured at the tip of its V-shaped notch, a reliable sealing is attained only when maintaining narrow tolerances especially of the outer conductor of the cable. However, since cable connector and cable are delivered by different producers, the admissable tolerances are frequently exceeded. Furthermore, a careful assembling is required. In particular, the contoured ring must be placed over the cable with correct orientation in order to provide the V-shaped notch in direction toward the strain relief ring. A further drawback resides in the fact that the strain relief ring, annular seal and thrust collar are furnished as loose parts and thus must be handled separately during assembling.

SUMMARY OF THE INVENTION

It is thus a principal object of the invention to provide an improved cable connector of this kind obviating the afore-stated drawbacks.

This object and others which will become apparent hereinafter is attained by providing the annular seal with a contoured outer ring and a contoured inner ring connected to each other by a bridge which becomes sheared off during axial displacement of the thrust collar toward the strain relief ring thereby compressing the inner and outer rings within the spaces between the thrust collar and the strain relief ring.

Advantageously, the thrust collar and the strain relief rings cooperate in shear-like manner with each other and include facing shoulders which during the axial displacement of the thrust collar overlap to a certain degree and shear off the bridge.

The provision of such a shear-like cooperation between the thrust collar and the strain relief ring allows a considerably greater dimensioning of the available path of relative displacement of these elements than prior art cable connectors. Thus, it is feasible to dimension the inner ring and the outer ring independently of each other and to adjust them according to the prevailing needs. In addition, the location and cross section of the inner and outer spaces between the thrust collar and the strain relief ring may be designed in various manners. Thence, a reliable sealing is attained even at greater tolerances. Furthermore, the strain relief ring together with the contoured annular seal and thrust collar can be packed as preassembled unit and as unit slipped over the cable during assembly of the cable connector. Thus, the assembly is simpler, faster and most reliable.

According to a further feature of the invention, the outer ring is provided at its opposing axial ends with inwardly directed enlargements which engage in respective grooves of the shoulders of the thrust collar and of the strain relief ring. Thus, the preassembled parts of the cable connector are securely held together as a unit.

Preferably, the bridge connects a central area of the outer ring with one axial end of the inner ring of the seal so that the strain relief ring may have a smooth inner bore without any steps, and the inner thrust collar may be sufficiently wide i.e. considerably wider than the annular seal according to the prior art.

In order to limit the axial displacement of the thrust collar and thus to prevent an inadmissibly high radial compression e.g. of a coaxial cable while still pressing the outer candiates of the cable against the metallic sleeve the shoulder of e.g. the thrust collar is provided with an internal step which is engageable by the shoulder of the strain relief ring.

According to a further feature of the present invention, the strain relief ring snugly surrounds the cable insulation so that a canting of the strain relief ring is prevented.

It should also be noted that the strain relief ring, annular seal and thrust collar can be shaped complementary to the shown designs.

BRIEF DESCRIPTION OF THE DRAWING

The above and other objects, features and advantages of the present invention will now be described in more detail with reference to the accompanying drawing in which.

SPECIFIC DESCRIPTION

Figure 1:
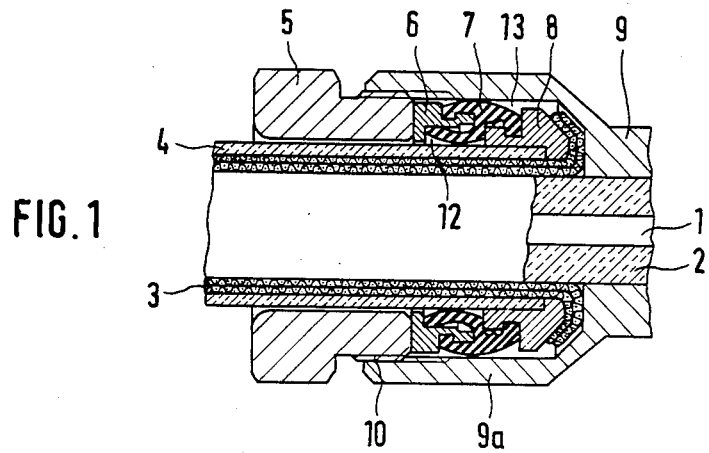
FIG. 1 is a longitudinal section of one embodiment of a cable connector according to the invention in a preassembled stage.

The nonlimiting example as illustrated in the drawing discloses a cable connector for a coaxial cable which includes an inner conductor 1 which is centered inside and insulated by a dielectric 2 from an outer conductor 3. The outer conductor 3 is made of a two-layer braiding and is of shorter axial length than the inner conductor 1. Surrounding the outer conductor 3 is an outer cable insulation 4 which is of even shorter axial length than the outer conductor 3.

Slipped in succession over the suitably prepared axial end of the cable are a hollow screw plug 5, a thrust collar 6, a contoured annular seal 7 and a strain relief ring 8. This strain relief ring 8 simultaneously provides the contacting of the outer conductor 3 with a metallic plug or coupler 9 which is placed over the cable after crimping the free end of the outer conductor 3 as shown in FIG. 1. The plug or coupler 9 is provided with a sleeve-like extension 9a which is provided with an internal thread 10 to cooperate with the screw plug 5 for tightening the assembly and connecting the outer conductors 3 with the metallic plug 9.

It should be noted that in the present example, the inner conductor is of secondary interest and thus its connection is not illustrated in detail.

Figures 3, 4, 5:
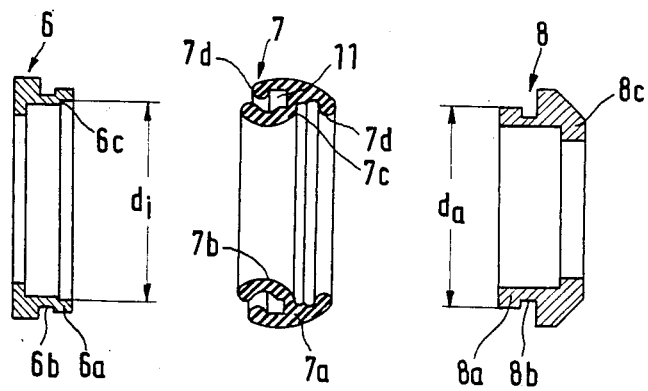
FIG. 3 is a sectional view through a thrust collar of the cable connector of FIG. 1.
FIG. 4 is a sectional view through a contoured annular seal of the cable connector of FIG. 1.
FIG. 5 is a sectional view through a strain relief ring of the cable connector of FIG. 1.

Turning now especially to FIG. 3, there is shown a longitudinal section of the thrust collar 6. Accordingly, the thrust collar 6 includes an axial shoulder 6a which is defined at its free end facing the strain relief ring 8 by an inner diameter $d_i$ and includes an outer circumferential groove 6b. Facing inwardly i.e. toward the outer conductor 3, the shoulder 6a is provided with an inner step 6c, the purpose of which will be described further below.

FIG. 4 illustrates the annular seal 7 which is disposed between the thrust collar 6 and the strain relief ring 8 and is shown as being of essentially h-shaped cross section. The seal 7 includes a contoured outer ring 7a which is connected to a contoured inner ring 7b by a bridge or web 7c so that the inner ring 7b extends at a distance to the outer ring 7a to define an intermediate space 11. The bridge 7c connects one axial end of the inner ring 7b facing the strain relief ring 8 with a central area of the outer ring 7a. At its opposing axial ends, the outer ring 7a includes inwardly facing enlargements 7d. The one enlargement 7d facing the thrust collar 6 is engageable in the groove 6b of the latter while the other enlargement 7d engages a suitable groove 8b of the strain relief ring 8.

In FIG. 5, the strain relief ring 8 is shown in detail and includes a shoulder 8a which at its free end facing the thrust collar 6 is defined by an outer diameter $d_a$ of slightly smaller dimension than the inner diameter $d_i$ of the thrust collar 6. The shoulder 8a is provided along its outer surface with the circumferential groove 8b which is engageable by the respective enlargement 7d of the seal 7. At its axial end remote to the thrust collar 6, the strain relief ring 8 is provided with an inwardly facing projection 8c which extends at the forward end of the cable insulation 4 after assembly of the cable connector.

The assembly of the cable connector according to the invention is as follows:

After slipping in succession over the still substantially straight outer conductor the screw plug 5, the thrust collar 6, the annular seal 7 and the strain relief ring 8, the axial end outer conductor 3 is crimped outwardly and the plug or coupler 9 is pushed over this cable end.

The screw plug 5 is then turned into the sleeve 9a so that the elements 5 to 9 abut each other. This preassembled stage is shown in FIG. 1 and it may be seen that the crimped end of the outer conductor 3 bears against the matching surface of the strain relief ring 8 while the thrust collar 6 projects into the space 11 between the outer and inner rings 7a, 7b of the seal 7 and is held in position by the respective enlargement 7d engaging in the groove 6b of the shoulder 6a of thrust collar 6. The strain relief ring 8 is held in position by engagement of the enlargement 7d at the other axial end of the seal 7 in the groove 8b while its projection 8c extends between the forward end of the insulation 4 and the crimped end of the outer conductor 3.

It will be readily recognized that in this stage of the assembly, the seal 7 is arranged between the thrust collar 6 and the strain relief ring 8, which form inner and outer annular spaces 12, 13, with the inner ring 7b still connected to the outer ring 7a via the bridge 7c.

Figure 2:
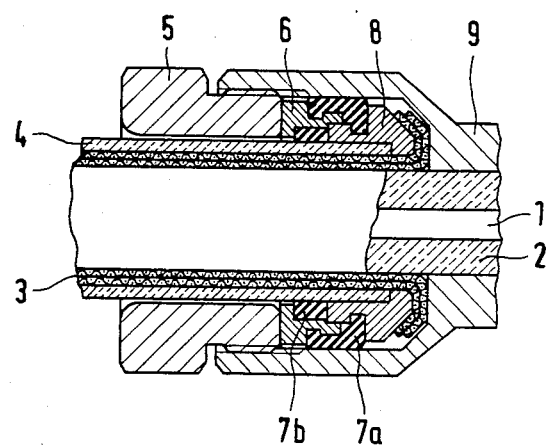
FIG. 2 is a longitudinal section of the cable connector of FIG. 1 after assembly thereof.

Subsequently, the screw plug 5 is further turned or screwed into the sleeve 9a thereby axially displacing the thrust collar 6 toward the strain relief ring 8 so that the bridge 7c shears off and the shoulders 6a, 8a overlap each other along an certain axial length. The outer ring 7a and the inner ring 7b become separated from each other and are compressed thereby filling the available annular inner and outer spaces 12, 13 with the outer ring 7a snugly fitting against the inside of the sleeve 9a and the inner ring 7b snugly fitting against the cable insulation 4. This stage is shown in FIG. 2. An excessive compression of the seal is prevented by the abutment of the end face of the shoulder 8a of the strain relief ring 8 against the inner step 6c of the thrust collar 6.

Although the invention has been described in connection with a cable connector for joining coaxial cable, it will be appreciated that the present invention should not be limited thereto as other applications are feasible within the scope of the invention, e.g. in connection with cable bushings. In this event, the strain relief ring is substituted by a correspondingly designed further thrust collar which bears either against a fixed inner collar of the outer sleeve or against a further screw plug which is arranged symmetrically to the first screw plug.

While the invention has been illustrated and described as embodied in a sealed cable connector, it is not intended to be limited to the details shown since various modifications and structural changes may be made without departing in any way from the spirit of the present invention.

What is claimed as new and desired to be protected by Letters Patent is set forth in the appended claims:

1. A sealed cable connector, comprising:
an outer sleeve extending over one axial end of a cable;
a first contoured element surrounded by said sleeve and disposed at said axial cable end;
a second contoured element surrounded by said sleeve and arranged at a distance to said first contoured element for defining an inner and an outer space therebetween; and
sealing means disposed in said inner and outer spaces between said first and second elements for providing a sealing between said sleeve and the cable, said sealing means including a contoured outer ring, a contoured inner ring and a radial bridge connecting said inner and outer rings, said second element cooperating with said first element in such a manner that said radial bridge is sheared off when said second element is axially displaced toward said first element thereby compressing said outer ring within said outer space and said inner ring within said inner space.

2. A cable connector as defined in claim 1 wherein said first element is a strain relief ring and said second element is a thrust collar, said strain relief ring and said thrust collar being provided with facing shoulders which upon axial displacement of said thrust collar overlap each along a certain axial length thereby shearing off said bridge.

3. A cable connector as defined in claim 2 wherein said outer ring is provided at its opposing axial ends with an inwardly directed enlargement, each of said shoulders of said thrust collar and of said strain relief ring being provided with an annular groove for receiving the respective one of said enlargements of said outer ring.

4. A cable connector as defined in claim 2 wherein said radial bridge connects a central area of said outer ring with one axial end of said inner ring.

5. A cable connector as defined in claim 2 wherein one of said shoulders is provided with a stepped surface for providing a stop for said other shoulder.

6. A cable connector as defined in claim 2 with a cable embraced by a cable insulation, said shoulder of said strain relief ring snugly surrounding said cable insulation.

7. A cable connector as defined in claim 2 wherein said strain relief ring is provided with a projection at its axial end remote to said thrust collar, said projection projecting into a space defined by the axial end of said cable insulation and the axial end of said cable.

8. A cable connector as defined in claim 2 wherein said sealing means is of essentially h-shaped cross section.

9. A cable connector as defined in claim 2 wherein said shoulder of said strain relief ring has an outer diameter and said shoulder of said thrust collar has an inner diameter which is slightly greater than the outer diameter of said strain relief ring.

10. A cable connector as defined in claim 1 wherein said cable is a coaxial cable and said sleeve is provided with an internal thread, and further comprising a hollow screw plug screwable into said sleeve along said internal thread so as to act on said second element to displace the latter in axial direction thereof toward said first element which presses the outer conductors of said cable against a contacting face of said sleeve.

* * * * *